United States Patent
Gigliarelli et al.

(10) Patent No.: US 9,800,424 B2
(45) Date of Patent: Oct. 24, 2017

(54) INITIAL SYNCHRONIZATION OF A MULTICAST GROUP

(71) Applicant: International Business Machines Corporation, Armonk, NY (US)

(72) Inventors: Gianluca Gigliarelli, Rome (IT); Antonio Secomandi, Rome (IT); Viviana Tripodi, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 89 days.

(21) Appl. No.: 14/938,378

(22) Filed: Nov. 11, 2015

(65) Prior Publication Data

US 2017/0134180 A1    May 11, 2017

(51) Int. Cl.
| H04L 12/18 | (2006.01) |
| H04L 12/923 | (2013.01) |
| H04L 12/911 | (2013.01) |
| H04L 12/927 | (2013.01) |

(52) U.S. Cl.
CPC ........ H04L 12/185 (2013.01); H04L 12/1863 (2013.01); H04L 47/762 (2013.01); H04L 47/806 (2013.01); H04L 47/822 (2013.01); H04L 47/828 (2013.01)

(58) Field of Classification Search
CPC ... H04L 12/18; H04L 12/185; H04L 12/1863; H04L 47/762; H04L 47/806; H04L 47/822; H04L 47/823; H04L 47/828
See application file for complete search history.

(56) References Cited

U.S. PATENT DOCUMENTS

| 6,256,673 | B1 | 7/2001 | Gayman |
| 6,269,080 | B1 | 7/2001 | Kumar |
| 8,767,733 | B2 | 7/2014 | Bijwaard et al. |
| 8,990,420 | B2 | 3/2015 | Glasser et al. |
| 2006/0029078 | A1* | 2/2006 | Lu .................. H04L 12/185 370/395.2 |
| 2010/0103934 | A1 | 4/2010 | Li et al. |
| 2012/0320732 | A1 | 12/2012 | Simu et al. |
| 2015/0195333 | A1 | 7/2015 | Glasser et al. |
| 2016/0226672 | A1* | 8/2016 | Calciu ................ H04L 12/1863 |

OTHER PUBLICATIONS

Sara Alouf, et al.: "On the Dynamic Estimation of multicast Group Siuzes"; INRIA Sophia Antipolis, B.P. 93; France; Jul. 2004; pp. 5.

* cited by examiner

*Primary Examiner* — Khoa Huynh
(74) *Attorney, Agent, or Firm* — Cantor Colburn LLP; Richard Wilhelm

(57) ABSTRACT

A method, computer program product, and system of managing multicast groups for distribution of multicast content to a plurality of targets are provided. Managing multicast groups includes receiving a plurality of requests to join a multicast group sent by the plurality of targets and evaluating from the plurality of requests a resource utilization required for each of the plurality of targets. Managing multicast groups further includes generating the multicast group by accepting targets of the plurality of targets; accumulating each resource utilization corresponding to each accepted target into an accumulated resource utilization; and closing, by the processor, the multicast group when the accumulated resource utilization of the accepted targets exceeds a group resource utilization limit.

18 Claims, 4 Drawing Sheets

Process Flow 300

INITIAL SYNCHRONIZATION OF A MULTICAST GROUP

BACKGROUND

The present disclosure relates generally to initial synchronization of a multicast group.

In contemporary implementations, initial synchronization of a multicast group is problematic since deployments start in a more or less random manner. Due to this random manner, performance of the multicast group is degraded as targets join the multicast group at different times. A contemporary option to counteract performance degradation is to maximize multicast opportunities using predefined thresholds (e.g., number of targets and time limits) to synchronize the multicast group. Yet, with predefined thresholds, it is difficult to tailor the configuration with changing environment conditions. In addition, contemporary implementations fail to take into account a current state and load of the environment when the multicast groups are established.

SUMMARY

Embodiments include a method, system, and computer program product for managing multicast groups for distribution of multicast content to a plurality of targets are provided. Managing multicast groups includes receiving a plurality of requests to join a multicast group sent by the plurality of targets and evaluating from the plurality of requests a resource utilization required for each of the plurality of targets. Managing multicast groups further includes generating the multicast group by accepting targets of the plurality of targets; accumulating each resource utilization corresponding to each accepted target into an accumulated resource utilization; and closing, by the processor, the multicast group when the accumulated resource utilization of the accepted targets exceeds a group resource utilization limit.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
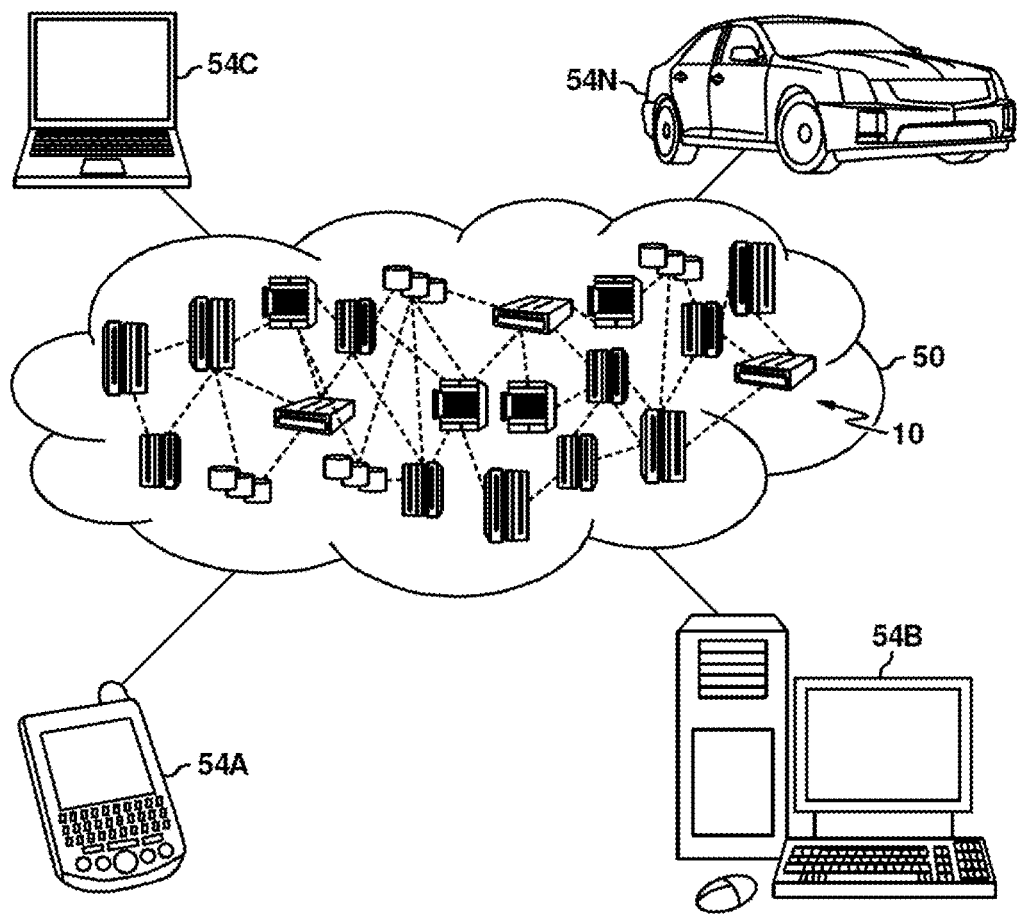
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
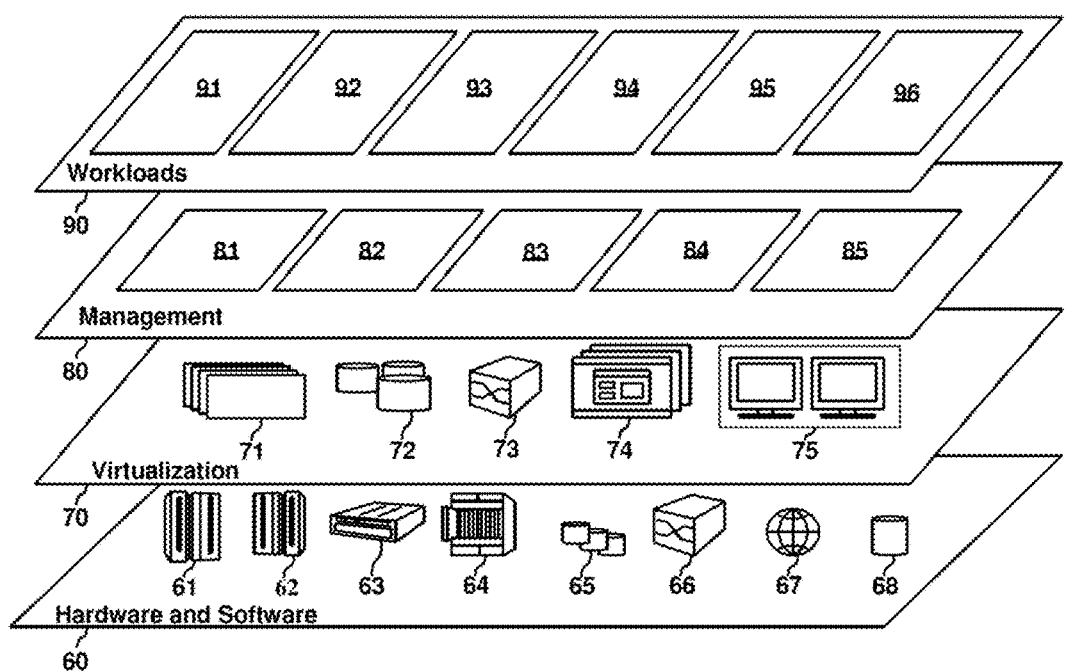
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multicasting 96.

In view of the above, embodiments described herein relate to forming a multicast group for multicast distribution at runtime based on environment circumstances and resources utilization. In this way, a single multicast group is not defined "a priori," while multiple multicast groups can exist as concurrent groups that consume the same resource.

A multicast distribution is a group communication (e.g., packets, multicast content) addressed to a group of destination computers simultaneously. A multicast distribution provides enhanced network utilization as files are sent over a network once to the group of destination computers (herein referred to as a multicast group). Thus, the multicast group is a collection receiving computers, such as servers, which can be referred to as clients or targets.

A multicast distribution includes a server side of an application to maintain information regarding which clients are receiving the group communication or multicast content. This information ensures that missing content is propagated again throughout the network for those targets that have not received it.

In contemporary implementations, the multicast group is defined when a distribution of multicast content is started. Additional targets are allowed to join the multicast group, but only after the distribution of multicast content has started. These late joining operations produce overhead and are cause inconvenient processing operations.

In embodiments herein, the multicast distribution starts simultaneously and is synchronized as the distribution of multicast content proceeds so that the server side of the application can provide the same information/content to all targets. Simultaneous and synchronized distribution of multicast content to the multicast group avoids any need of re-transmissions (as a side effect of contemporary implementations).

Figure 3:
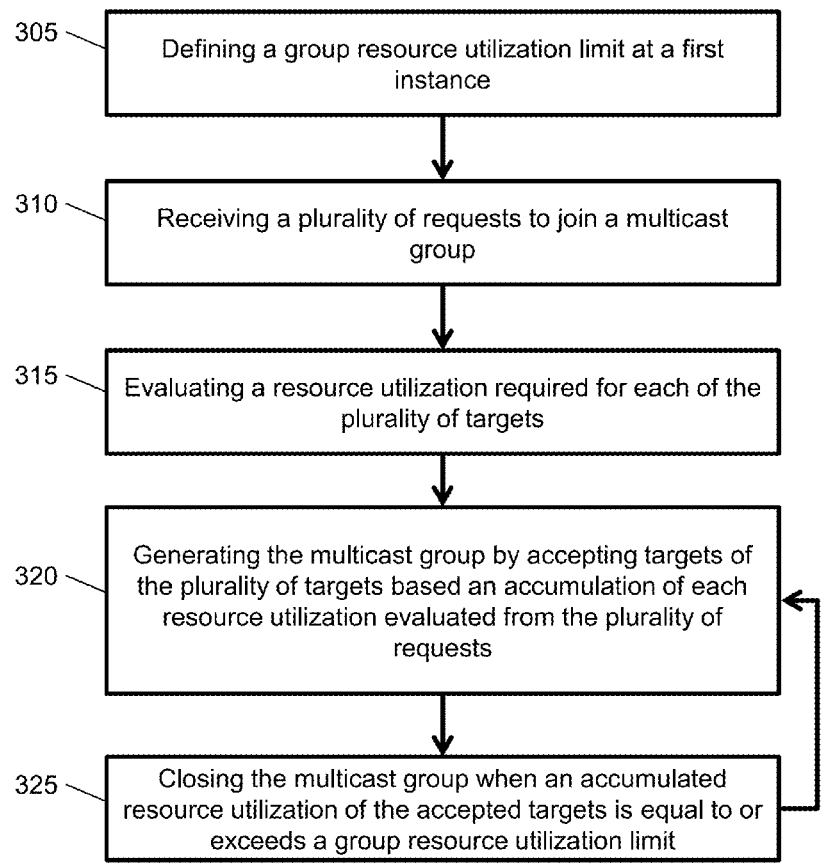
FIG. 3 depicts a process flow for forming a multicast group in accordance with an embodiment.

Turning now to FIG. 3, a process flow 300 for forming a multicast group is generally shown in accordance with an embodiment. The process flow 300 illustrates operations for managing multicast groups for distribution of information to a plurality of targets.

The process flow 300 begins at block 305, where a computing device (e.g., a computing node 10) defines a group resource utilization limit. The group resource utilization limit can be related to available bandwidth in a computing environment (e.g., the cloud computing environment 50) and metrics representing expected utilization of the available bandwidth. Note that resource utilization is not limited to network bandwidth. For example, resource utilization can also refer to other resources, such as memory, disks, processors, etc. The group resource utilization limit can be defined at a first instance in time, such as prior to performing a distribution operation, and can be redefined as needed by the computing device based on environment conditions (e.g., conditions of the cloud computing environment 50). For example, the group resource utilization limit can be decreased when a distribution of multicast content occurs during a peak bandwidth utilization time (thereby reducing the number of targets per group) and increased when another distribution of multicast content occurs during an off-peak time (thereby increasing the number of targets per group). In this way, the group resource utilization limit is not a predefined threshold value, but rather a mechanism that is able to adapt with actual environment resource utilization.

At block 310, the computing device receives a plurality of requests to join a multicast group. Each request can originate from one of the plurality of targets. At block 315, the computing device evaluates a resource utilization for each of the plurality of targets. Each resource utilization can be an expected resource utilization by a corresponding target.

At block 320, the computing device generates the multicast group by accepting targets of the plurality of targets. Each target is accepted in view of an accumulation of the resource utilization evaluated from the plurality of requests. That is, as each target is accepted, the computing device accumulates its corresponding resource utilization into a total.

At block 325, the computing device closes the multicast group. The multicast group can close when an accumulated resource utilization of the accepted targets (e.g., the total expected resource utilization of the multicast group) exceeds the resource utilization limit. In another embodiment, the computing device can revert subsequent requests, which can cause a group closure. In another embodiment, whenever the group resource utilization limit is less than the total expected resource utilization of the multicast group and a predefined multicast group cutoff time is reached. The process flow 300 can consider multiple groups by looping back to block 320 based on a number of the remaining requests to join the multicast group and/or late joining targets. For example, late joining clients are not allowed in a presently forming multicast group. Rather, a new multicast group is formed. In turn, the targets do not have to continuously poll the computing device to determine if a 'threshold' has been reached and can remain queued in wait state as needed.

Thus, the multicast grouping operation of the process flow 300 improves overall performances of multicast deployment operations, as environment resources are appropriately utilized. In turn, the process flow 300 can manage situations where a number of targets is not predictable and where the group resource utilization limit changes over time (e.g., limit can vary in certain hours or days), hence allowing for a more accurate multicast group synchronization.

Figure 4:
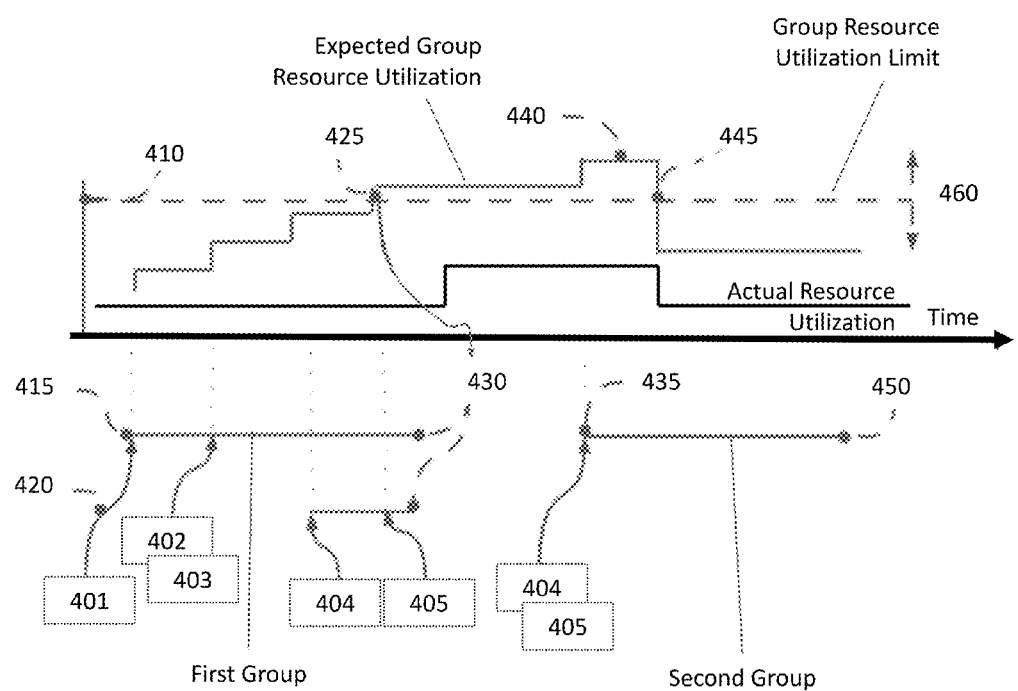
FIG. 4 illustrates a graph depicting the formation of a multicast group in accordance with an embodiment.

FIG. 4 illustrates a graph 400 depicting the formation of multicast groups utilizing a plurality of targets 401-405 with respect to time and actual resource utilization in accordance with an embodiment.

At demarcation 410, a group resource utilization limit (represented by the dotted line) is set in view of the actual resource utilization. At demarcation 415, a first multicast group is opened when the first target 401 performs a group join operation as noted by demarcation 420. In turn, subsequent group join operations can be performed. Note how each group join operation increments an expected group resource utilization.

When targets 401, 402, and 403 join the first multicast group, the expected group resource utilization increments three times. Further, when the targets 404 and 405 attempt to join the group, the expected group resource utilization increments over the group resource utilization limit (as shown at demarcation 425). In turn, at demarcation 430, the first multicast group is closed and targets 404 and 405 are placed in a queue. Note that an actual deployment does not start until the first multicast group is closed, as represented by the spike in the actual resource utilization. Thus, when resources utilization limits are reached, the first multicast group is closed as it becomes implicit that the addition of other targets within the first multicast group will cause unexpected effects. The targets 404 and 405 that have requested a group join remain in a queue (wait state) until the first multicast group is closed.

At demarcation 435, a second multicast group is opened and all the targets (404 and 405) are taken out of the wait state "simultaneously" and now belong to that second multicast group. In this way, a second multicast group is established and a multicast distribution for this new group can start when the group close conditions are met. In this way, the distribution is performed with no overhead due to sporadic group join.

In addition, demarcation 440 identifies what an expected group resource consumption would have been if the targets 404 and 405 were added to the first group. That is, as targets are added to groups, the resources utilization (e.g., group resource utilization limit) forecast are updated to reflect the new scenarios. At demarcation 445, a group distribution ends. At demarcation 450, the second multicast group is closed. At demarcation 460, the group resource utilization limit can be varied according to the actual resource utilization, such that as many targets as possible can be included in the multicast group without deteriorating an overall system performance of the environment.

Technical effects and benefits of embodiments herein include a dynamic computation of a number of members in a multicast group, obtained by enlarging or decreasing a time window to accept joining members, based on utilization of resources with a resynchronization of a next deployment to the multicast group. Thus, embodiments described herein are necessarily rooted in computing nodes to perform proactive operations to overcome problems specifically arising in the realm of multicast distribution (e.g., these problems include the need of frequent re-transmissions due to late joining operations, resulting in unwanted costs and expenses). For example, while contemporary implementations are non-optimal, the embodiments herein provide simultaneous and synchronized distribution of multicast content to the multicast group.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing multicast groups for distribution of multicast content to a plurality of targets, comprising:
   receiving, by a processor coupled to a memory, a plurality of requests to join a multicast group sent by the plurality of targets;
   evaluating, by the processor, from the plurality of requests a resource utilization required for each of the plurality of targets;
   generating, by the processor, the multicast group by accepting targets of the plurality of targets;
   accumulating, by the processor, each resource utilization corresponding to each accepted target into an accumulated resource utilization;
   closing, by the processor, the multicast group when the accumulated resource utilization of the accepted targets exceeds a group resource utilization limit; and
   generating a second multicast group beginning with a target that causes the accumulated resource utilization to exceed the group resource utilization limit.

2. The method of claim 1, further comprising closing the multicast group when the accumulated resource utilization of the accepted targets is less than the group resource utilization limit and a predefined time cutoff is reached.

3. The method of claim 1, further comprising defining the group resource utilization limit at a first instance based on environment conditions at a time of creating the multicast group.

4. The method of claim 3, further comprising varying the group resource utilization limit based on environment conditions at a time subsequent to creating the multicast group.

5. The method of claim 3, where the environment conditions include an available bandwidth and computing resources.

6. The method of claim 1, further comprising placing late joining targets in a queue while the multicast group is generated.

7. Repeating the method of claim 1 to satisfy a remaining set of the plurality of requests.

8. A computer program product, the computer program product comprising a non-transitory computer readable storage medium having program instructions for managing multicast groups for distribution of multicast content to a plurality of targets embodied therewith, the program instructions executable by a processor to cause the processor to perform:
   receiving a plurality of requests to join a multicast group sent by the plurality of targets;
   evaluating from the plurality of requests a resource utilization required for each of the plurality of targets;
   generating the multicast group by accepting targets of the plurality of targets;
   accumulating each resource utilization corresponding to each accepted target into an accumulated resource utilization;
   closing the multicast group when the accumulated resource utilization of the accepted targets exceeds a group resource utilization limit; and
   generating a second multicast group beginning with a target that causes the accumulated resource utilization to exceed the group resource utilization limit.

9. The computer program product of claim 8, the program instructions executable to further cause the processor to perform:
   closing the multicast group when the accumulated resource utilization of the accepted targets is less than the group resource utilization limit and a predefined time cutoff is reached.

10. The computer program product of claim 8, the program instructions executable to further cause the processor to perform:
   defining the group resource utilization limit at a first instance based on environment conditions at a time of creating the multicast group.

11. The computer program product of claim 10, the program instructions executable to further cause the processor to perform:
   varying the group resource utilization limit based on environment conditions at a time subsequent to creating the multicast group.

12. The computer program product of claim 10, wherein the environment conditions include an available bandwidth and computing resources.

13. The computer program product of claim 8, the program instructions executable to further cause the processor to perform:
   placing late joining targets in a queue while the multicast group is generated.

14. The computer program product of claim 10, wherein the program instructions are repeatedly executed to further cause the processor to satisfy a remaining set of the plurality of requests.

15. A system, comprising:
   a memory having computer readable instructions for managing multicast groups for distribution of multicast content to a plurality of targets embodied therewith; and
   a processor for executing the computer readable instructions, to cause the system to perform:
   receiving a plurality of requests to join a multicast group sent by the plurality of targets;
   evaluating from the plurality of requests a resource utilization required for each of the plurality of targets;
   generating the multicast group by accepting targets of the plurality of targets;
   accumulating each resource utilization corresponding to each accepted target into an accumulated resource utilization;
   closing the multicast group when the accumulated resource utilization of the accepted targets exceeds a group resource utilization limit; and
   generating a second multicast group beginning with a target that causes the accumulated resource utilization to exceed the group resource utilization limit.

16. The system of claim 15, the program instructions executable to further cause the system to perform:

closing the multicast group when the accumulated resource utilization of the accepted targets is less than the group resource utilization limit and a predefined time cutoff is reached.

17. The system of claim 15, the program instructions executable to further cause the system to perform:
defining the group resource utilization limit at a first instance based on environment conditions at a time of creating the multicast group.

18. The system of claim 17, the program instructions executable to further cause the system to perform:
varying the group resource utilization limit based on environment conditions at a time subsequent to creating the multicast group.

\* \* \* \* \*